United States Patent
Bunno et al.

(10) Patent No.: US 10,669,891 B2
(45) Date of Patent: Jun. 2, 2020

(54) BEARING STRUCTURE AND TURBOCHARGER

(71) Applicant: IHI Corporation, Koto-ku (JP)

(72) Inventors: Kenji Bunno, Tokyo (JP); Yutaka Uneura, Tokyo (JP); Shinichi Kaneda, Tokyo (JP); Yuichi Daito, Tokyo (JP); Hideyuki Kojima, Tokyo (JP); Tomomi Sugiura, Tokyo (JP); Shunsuke Nishii, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/886,361

(22) Filed: Feb. 1, 2018

(65) Prior Publication Data

US 2018/0156065 A1 Jun. 7, 2018

Related U.S. Application Data

(63) Continuation of application No. PCT/JP2016/072173, filed on Jul. 28, 2016.

(30) Foreign Application Priority Data

Aug. 11, 2015 (JP) .................................. 2015-158839

(51) Int. Cl.
*F01D 25/16* (2006.01)
*F16C 35/02* (2006.01)
(Continued)

(52) U.S. Cl.
CPC ............... *F01D 25/16* (2013.01); *F01D 9/06* (2013.01); *F01D 25/00* (2013.01); *F01D 25/168* (2013.01);
(Continued)

(58) Field of Classification Search
CPC . F01D 9/06; F01D 25/00; F01D 25/16; F01D 25/18; F01D 25/168; F02B 39/14;
(Continued)

(56) References Cited

U.S. PATENT DOCUMENTS

| 4,396,197 A | 8/1983 | Shimizu |
| 2007/0041851 A1 | 2/2007 | Shibui et al. |

(Continued)

FOREIGN PATENT DOCUMENTS

| CN | 102733932 A | 10/2012 |
| EP | 1 757 785 B1 | 10/2008 |

(Continued)

OTHER PUBLICATIONS

International Search Report dated Oct. 25, 2016 in PCT/JP2016/072173, filed on Jul. 28, 2016 (with English Translation).

(Continued)

*Primary Examiner* — David E Sosnowski
*Assistant Examiner* — Juan G Flores
(74) *Attorney, Agent, or Firm* — Oblon, McClelland, Maier & Neustadt, L.L.P.

(57) ABSTRACT

A bearing structure includes: a housing; a bearing hole, which is formed in the housing, and receives a bearing configured to axially support a shaft having one end provided with an impeller; a clearance groove, which is formed in an inner circumferential surface of the bearing hole, and communicates with a passage formed on a lower side of the shaft; and an inclined portion formed on an inner wall surface of the clearance groove, which is positioned at least above the shaft.

8 Claims, 2 Drawing Sheets

(51) Int. Cl.
*F16C 17/18* (2006.01)
*F16C 17/04* (2006.01)
*F16C 33/10* (2006.01)
*F01D 25/00* (2006.01)
*F02B 39/14* (2006.01)
*F01D 9/06* (2006.01)
*F01D 25/18* (2006.01)

(52) U.S. Cl.
CPC .............. *F01D 25/18* (2013.01); *F02B 39/14* (2013.01); *F16C 17/04* (2013.01); *F16C 17/18* (2013.01); *F16C 33/1025* (2013.01); *F16C 35/02* (2013.01); *F05D 2220/40* (2013.01); *F05D 2240/52* (2013.01); *F16C 2360/24* (2013.01)

(58) Field of Classification Search
CPC ...... F16C 17/04; F16C 17/18; F16C 33/1025; F16C 35/02; F16C 33/103; F16C 2360/24; F05D 2220/40; F05D 2240/52; F05D 2360/24
USPC ......................................................... 415/110
See application file for complete search history.

(56) References Cited

U.S. PATENT DOCUMENTS

| | | | |
|---|---|---|---|
| 2010/0218499 A1* | 9/2010 | Shibui | F02B 37/10 60/607 |
| 2012/0263589 A1 | 10/2012 | Iwata et al. | |
| 2016/0245160 A1 | 8/2016 | Ueda et al. | |
| 2018/0023620 A1* | 1/2018 | Berger | F16C 17/10 384/107 |
| 2018/0156269 A1* | 6/2018 | Bunno | F01D 25/166 |
| 2018/0231053 A1* | 8/2018 | Uneura | F16C 17/10 |

FOREIGN PATENT DOCUMENTS

| | | |
|---|---|---|
| JP | 55-104725 U | 1/1954 |
| JP | 57-119165 U | 1/1956 |
| JP | 55-104725 U | 7/1980 |
| JP | 6-317171 | 11/1994 |
| JP | 7-174029 A | 7/1995 |
| JP | 9-250353 A | 9/1997 |
| JP | 11-2136 | 1/1999 |
| JP | 2004-132319 | 4/2004 |
| JP | 2005-214094 | 8/2005 |
| JP | 2007-321698 A | 12/2007 |
| JP | 2009-243306 | 10/2009 |
| JP | 4432511 | 3/2010 |
| JP | 2011-111900 | 6/2011 |
| JP | 2012-57507 A | 3/2012 |
| JP | 2012-102660 A | 5/2012 |
| JP | 2013-124649 A | 6/2013 |
| JP | 2014015854 A * | 1/2014 |
| JP | 2014-152634 | 8/2014 |
| JP | 2014-238009 | 12/2014 |
| JP | 2015-45301 | 3/2015 |
| WO | WO 2015/114971 A1 | 8/2015 |

OTHER PUBLICATIONS

Written Opinion dated Oct. 25, 2016 in PCT/JP2016/072173, filed on Jul. 28, 2016.
Combined Chinese Office Action and Search Report dated Dec. 5, 2018 in Patent Application No. 201680045344.1 (with English and Japanese language translations).
English translation of the International Preliminary Report on Patentability and Written Opinion dated Feb. 22, 2018 in PCT/JP2016/072173, 6 pages.
Office Action dated Jul. 5, 2018, in German Patent Application No. 11 2016 003 647.7, (with English translation), 12 pages.
Office Action dated Oct. 2, 2018 in Japanese Patent Application No. 2017-534177 (with English translation), 6 pages.
Japanese Office Action issued in Japanese Patent Application No. 2017-534177 dated Sep. 10, 2019, (w/ English translation).

* cited by examiner

BEARING STRUCTURE AND TURBOCHARGER

CROSS REFERENCE TO RELATED APPLICATIONS

This application is a continuation application of International Application No. PCT/JP2016/072173, filed on Jul. 28, 2016, which claims priority to Japanese Patent Application No. 2015-158839, filed on Aug. 11, 2015, the entire contents of which are incorporated by reference herein.

BACKGROUND ART

Technical Field

The present disclosure relates to a bearing structure which is configured to axially support a shaft, and to a turbocharger.

Related Art

Hitherto, there has been known a turbocharger in which a shaft is axially supported so as to be rotatable in a bearing housing. A turbine impeller is provided at one end of the shaft, and a compressor impeller is provided at another end of the shaft. The turbocharger is connected to an engine. The turbine impeller is rotated by exhaust gas discharged from the engine. The rotation of the turbine impeller causes the compressor impeller to rotate through the shaft. With this action, the turbocharger compresses air along with the rotation of the compressor impeller and delivers the compressed air to the engine.

In a turbocharger disclosed in Patent Literature 1, a bearing is received in a bearing hole formed in a housing. A shaft is axially supported by the bearing. Lubricating oil having lubricated the bearing flows out to a space formed between the bearing hole and the impeller in the housing. The lubricating oil having flowed out to the space flows down through a passage formed on a vertically lower side with respect to the bearing hole and is discharged to an outside of the housing.

CITATION LIST

Patent Literature

Patent Literature 1: Japanese Patent Application Laid-Open No. 2011-111900

SUMMARY

Technical Problem

By the way, in the turbocharger disclosed in Patent Literature 1, for example, seal rings are arranged between the above-mentioned space and the impeller. The seal rings suppress leakage of the lubricating oil to the impeller side. However, when the amount of lubricating oil supplied to the bearing is large, there is a fear in that part of the lubricating oil flowing out from the bearing hole to the above-mentioned space leaks to the impeller side.

An object of the present disclosure is to provide a bearing structure which is capable of improving oil discharge performance, and a turbocharger.

Solution to Problem

In order to achieve the above-mentioned problem, according to one embodiment of the present disclosure, there is provided a bearing structure, including: a housing; a bearing hole, which is formed in the housing, and receives a bearing configured to axially support a shaft having one end provided with an impeller; a clearance groove, which is formed in an inner circumferential surface of the bearing hole, and communicates with a passage formed on a lower side with respect to the shaft; and an inclined portion formed on an inner wall surface of the clearance groove, which is positioned at least above the shaft.

The inclined portion may be inclined in a direction of separating from the impeller on a radially outer side of the shaft.

The bearing structure may have a pocket portion which extends, on the radially outer side of the shaft with respect to the clearance groove, in a rotation direction of the shaft with a partition wall being placed between the pocket portion and the bearing hole.

The inclined portion may be inclined in a direction of approaching the pocket portion on the radially outer side of the shaft.

The pocket portion may continue from the clearance groove in the direction of separating from the impeller.

The pocket portion may continue from the clearance groove in a direction of approaching the impeller.

The bearing structure may have a space, which is formed in the housing, is positioned between the impeller provided at the one end of the shaft and the clearance groove, and communicates with the passage.

The pocket portion may include an upper side with respect to the shaft and extend to the radially outer side of the shaft with respect to the space.

The inclined portion may extend in a rotation direction of the shaft to a lower side with respect to the shaft.

The bearing may include a thrust bearing surface which is opposed to a collar portion formed on the shaft in the axial direction of the shaft, and the inclined portion may be opposed to the thrust bearing surface in the radial direction.

In order to achieve the above-mentioned problem, according to one embodiment of the present disclosure, there is provided a turbocharger, including the above-mentioned bearing structure.

Effects of Disclosure

According to the present disclosure, the oil discharge performance can be improved.

DESCRIPTION OF EMBODIMENT

Figure 1:
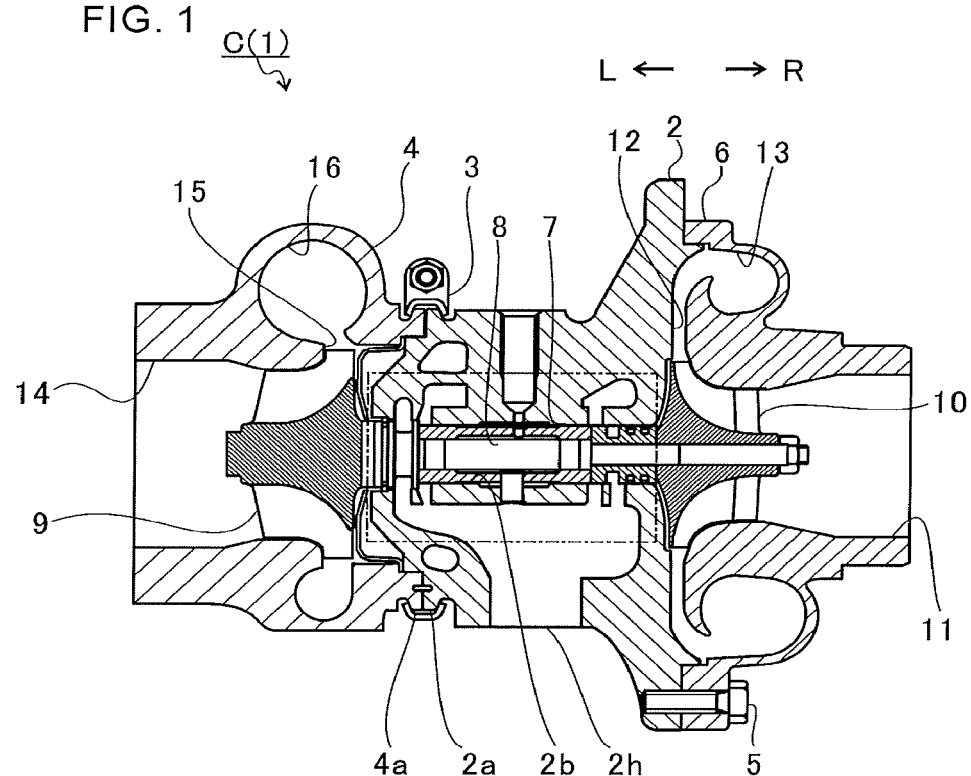
FIG. 1 is a schematic sectional view of a turbocharger.

Now, with reference to the attached drawings, an embodiment of the present disclosure is described in detail. The dimensions, materials, and other specific numerical values represented in the embodiment are merely examples used for facilitating the understanding of the present disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2 (housing). A turbine housing 4 is coupled to the left side of the bearing housing 2 by a fastening mechanism 3. Further, a compressor housing 6 is coupled to the right side of the bearing housing 2 by a fastening bolt 5. The bearing housing 2, the turbine housing 4, and the compressor housing 6 are integrally formed.

On an outer circumferential surface of the bearing housing 2 in the vicinity of the turbine housing 4, there is formed a projection 2a. The projection 2a projects in a radial direction of the bearing housing 2. Further, on an outer circumferential surface of the turbine housing 4 in the vicinity of the bearing housing 2, there is formed a projection 4a. The projection 4a projects in a radial direction of the turbine housing 4. The bearing housing 2 and the turbine housing 4 are fixed to each other by band-fastening the projections 2a and 4a with the fastening mechanism 3. The fastening mechanism 3 is constructed by, for example, a G-coupling for clamping the projections 2a and 4a.

The bearing housing 2 has a bearing hole 2b. The bearing hole 2b penetrates in a right-and-left direction of the turbocharger C. A shaft 8 is axially supported so as to be rotatable by a semi-floating bearing 7 (bearing), which is provided to the bearing hole 2b. A turbine impeller 9 (impeller) is integrally fixed to a left end portion of the shaft 8. The turbine impeller 9 is received in the turbine housing 4 so as to be rotatable. Further, a compressor impeller 10 (impeller) is integrally fixed to a right end portion of the shaft 8. The compressor impeller 10 is received in the compressor housing 6 so as to be rotatable.

The compressor housing 6 has an intake port 11, which is opened on the right side of the turbocharger C. The intake port 11 is connected to an air cleaner (not shown). Further, under a state in which the bearing housing 2 and the compressor housing 6 are coupled to each other by the fastening bolt 5, a diffuser flow passage 12 is formed by opposed surfaces of the bearing housing 2 and the compressor housing 6. In the diffuser flow passage 12, the air is increased in pressure. The diffuser flow passage 12 is annularly formed so as to extend from a radially inner side to a radially outer side of the shaft 8. The diffuser flow passage 12 communicates with the intake port 11 on the above-mentioned radially inner side through intermediation of the compressor impeller 10.

Further, the compressor housing 6 has an annular compressor scroll flow passage 13. The compressor scroll flow passage 13 is positioned on the radially outer side of the shaft 8 with respect to the diffuser flow passage 12. The compressor scroll flow passage 13 communicates with an intake port of an engine (not shown). The compressor scroll flow passage 13 communicates also with the diffuser flow passage 12. Thus, when the compressor impeller 10 is rotated, air is sucked into the compressor housing 6 through the intake port 11. Further, the sucked air is increased in speed by a centrifugal force during a course of flowing through blades of the compressor impeller 10. The air having been increased in speed is increased in pressure in the diffuser flow passage 12 and the compressor scroll flow passage 13, and is introduced to the intake port of the engine.

The turbine housing 4 has a discharge port 14. The discharge port 14 is opened on the left side of the turbocharger C. Further, the discharge port 14 is connected to an exhaust gas purification device (not shown). Further, a flow passage 15 and an annular turbine scroll flow passage 16 are formed in the turbine housing 4. The turbine scroll flow passage 16 is positioned on the radially outer side of the turbine impeller 9 with respect to the flow passage 15. The turbine scroll flow passage 16 communicates with a gas inflow port (not shown). The exhaust gas discharged from an exhaust gas manifold of the engine (not shown) is introduced to the gas inflow port. Further, the turbine scroll flow passage 16 communicates also with the flow passage 15. Thus, the exhaust gas introduced through the gas inflow port to the turbine scroll flow passage 16 is introduced to the discharge port 14 through the flow passage 15 and the turbine impeller 9. The exhaust gas to be introduced to the discharge port 14 causes the turbine impeller 9 to rotate in the process of flowing therethrough.

Then, a rotational force of the turbine impeller 9 is transmitted to the compressor impeller 10 through the shaft 8. The rotational force of the compressor impeller 10 causes the air to be increased in pressure and introduced to the intake port of the engine as described above.

Figure 2:
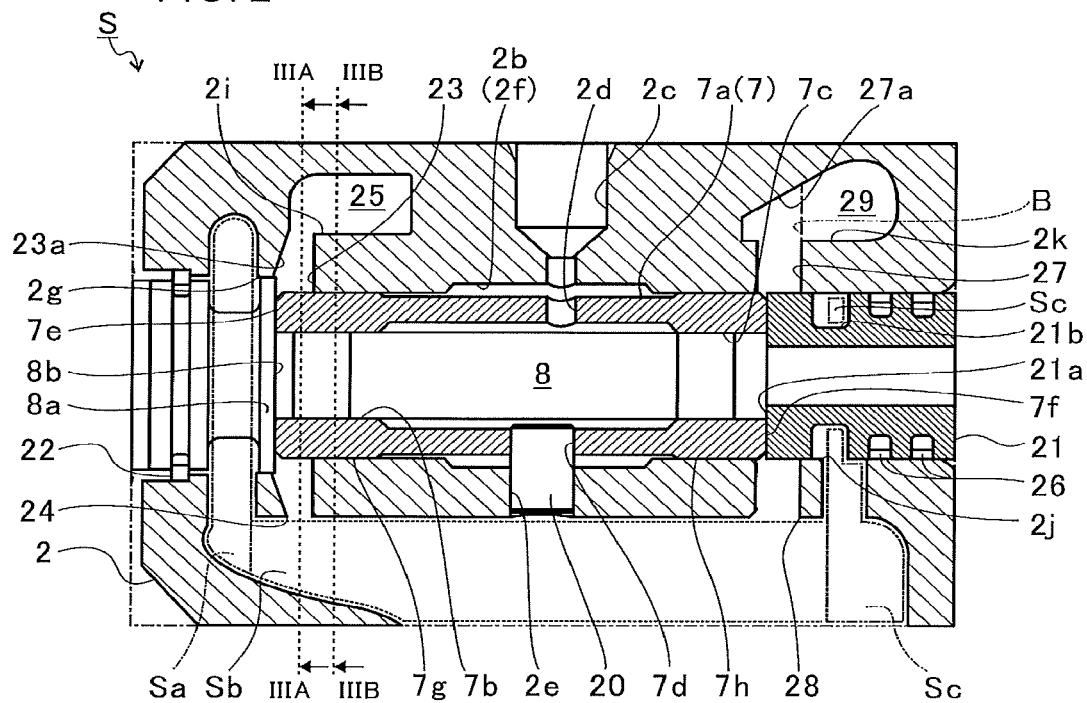
FIG. 2 is an extraction view of the one-dot chain line portion of FIG. 1.

FIG. 2 is an extraction view of the one-dot chain line portion of FIG. 1. As illustrated in FIG. 2, a bearing structure S is provided in the bearing housing 2. In the bearing structure S, the lubricating oil flows into the bearing hole 2b through an oil passage 2c formed in the bearing housing 2. The lubricating oil having flowed into the bearing hole 2b is supplied to the semi-floating bearing 7 provided in the bearing hole 2b.

The semi-floating bearing 7 includes an annular main body portion 7a. The shaft 8 is inserted to the main body portion 7a. On an inner circumferential surface of the main body portion 7a, there are formed two bearing surfaces 7b and 7c. The two bearing surfaces 7b and 7c are separated apart in an axial direction of the shaft 8 (hereinafter simply referred to as "axial direction").

In the main body portion 7a, there is formed an oil hole 2d which penetrates from the inner circumferential surface to the outer circumferential surface. Part of the lubricating oil supplied to the bearing hole 2b flows into the inner circumferential surface of the main body portion 7a through the oil hole 2d. The lubricating oil having flowed into the inner circumferential surface of the main body portion 7a is supplied to a gap between the shaft 8 and the bearing surfaces 7b and 7c. The shaft 8 is axially supported by oil film pressure of the lubricating oil supplied to the gap between the shaft 8 and the bearing surfaces 7b and 7c.

Further, the main body portion 7a has a through hole 7d. The through hole 7d penetrates from the inner circumferential surface to the outer circumferential surface of the main body portion 7a. The bearing housing 2 has a pin hole 2e formed at a portion opposed to the through hole 7d. The pin hole 2e penetrates through a wall portion forming the bearing hole 2b. A positioning pin 20 is held in the pin hole 2e from a lower side of FIG. 2 by, for example, press-fitting. A tip of the positioning pin 20 is inserted to the through hole 7d of the semi-floating bearing 7. With this configuration, the positioning pin 20 regulates rotation and axial movement of the semi-floating bearing 7.

Further, an oil thrower member 21 (collar portion) is fixed to the shaft 8 more on the right side in FIG. 2 (compressor impeller 10 side) than the main body portion 7a. The oil thrower member 21 is an annular member. The oil thrower member 21 causes the lubricating oil, which flows to the compressor impeller 10 side along the axial direction of the shaft 8, to be diffused to the radially outer side. That is, the oil thrower member 21 suppresses leakage of the lubricating oil to the compressor impeller 10 side.

The oil thrower member 21 is opposed to the main body portion 7a in the axial direction. An outer diameter of an opposed surface 21a of the oil thrower member 21 with respect to the main body portion 7a is larger than an inner diameter of the bearing surface 7c.

Further, the shaft 8 has a large-diameter portion 8a (collar portion). The large-diameter portion 8a has an outer diameter which is larger than an inner diameter of the bearing surface 7b of the main body portion 7a. Further, for example, the outer diameter of the large-diameter portion 8a is larger than an outer diameter of the main body portion 7a. The large-diameter portion 8a is positioned on the left side in FIG. 2 (turbine impeller 9 side) with respect to the main body portion 7a. The large-diameter portion 8a is opposed to the main body portion 7a in the axial direction.

As described above, the main body portion 7a is sandwiched between the oil thrower member 21 and the large-diameter portion 8a in the axial direction. Further, the positioning pin 20 regulates movement of the main body portion 7a in the axial direction. The lubricating oil is supplied to each of a gap between the main body portion 7a and the oil thrower member 21 and a gap between the main body portion 7a and the large-diameter portion 8a. When the shaft 8 moves in the axial direction, the oil thrower member 21 or the large-diameter portion 8a is supported by the oil film pressure at the gap formed with the main body portion 7a. That is, both end surfaces of the main body portion 7a of the semi-floating bearing 7 in the axial direction are bearing surfaces 7e and 7f (thrust bearing surfaces). The bearing surfaces 7e and 7f receive thrust load.

Further, damper portions 7g and 7h are formed on both end sides of the outer circumferential surface of the main body portion 7a in the axial direction. The damper portions 7g and 7h suppress oscillation of the shaft 8 by the oil film pressure of the lubricating oil supplied to a gap formed with the inner circumferential surface 2f of the bearing hole 2b.

As described above, part of the lubricating oil supplied to the bearing surfaces 7b and 7e and the damper portion 7g flows out from the bearing hole 2b to the turbine impeller 9 side. In the bearing housing 2, a space Sa is formed between the turbine impeller 9 and the bearing hole 2b. Specifically, the space Sa is formed adjacent to one end 2g of the bearing hole 2b on the turbine impeller 9 side. That is, the space Sa is continuous with the bearing hole 2b in the axial direction of the shaft 8. Further, the space Sa extends to the radially outer side with respect to the bearing hole 2b. The lubricating oil having flowed out from the bearing hole 2b to the turbine impeller 9 side is diffused to the radially outer side in the space Sa by the centrifugal force caused by rotation with the shaft 8.

The space Sa continues to a passage Sb on the vertically lower side (lower side in FIG. 2) of the bearing hole 2b. The passage Sb extends on the vertically lower side of the bearing hole 2b in the bearing housing 2. The passage Sb communicates with an oil discharge port 2h, which is formed on the lower side (vertically lower side) of FIG. 1, in the bearing housing 2 illustrated in FIG. 1.

The lubricating oil having been diffused to the vertically upper side with respect to the shaft 8 in the space Sa flows down to the vertically lower side with respect to the shaft 8 along the inner wall of the bearing housing 2 forming the space Sa. The lubricating oil having flowed down merges with the lubricating oil having been diffused to the vertically lower side with respect to the shaft 8 in the space Sa. The merged lubricating oil is introduced to the passage Sb. The lubricating oil having been introduced to the passage Sb flows down through the passage Sb toward the oil discharge port 2h. The lubricating oil having flowed down is discharged to the outside of the bearing housing 2.

Further, a seal ring 22 is arranged between the space Sa and the turbine impeller 9. The seal ring 22 is positioned in a gap between the shaft 8 and the bearing housing 2 in the radial direction. The seal ring 22 suppresses leakage of the lubricating oil from the space Sa side to the turbine impeller 9 side.

As described above, the seal ring 22 suppresses the leakage of the lubricating oil to the turbine impeller 9 side. However, when the amount of the lubricating oil flowing out from the bearing hole 2b to the space Sa is excessively large, the sealing performance of the seal ring 22 is degraded. Therefore, in this embodiment, a clearance groove 23 is formed in the inner circumferential surface 2f of the bearing hole 2b.

The clearance groove 23 is separated apart from the space Sa in the axial direction of the shaft 8, that is, to the center side of the bearing hole 2b. The space Sa is positioned between the turbine impeller 9 and the clearance groove 23. The part of the lubricating oil having been supplied to the bearing surfaces 7b and 7e and the damper portion 7g flows into the clearance groove 23.

Further, an opposed surface 8b of the large-diameter portion 8a with respect to the main body portion 7a is positioned on a radially inner side of the clearance groove 23. Thus, the lubricating oil having lubricated the bearing surfaces 7b and 7e is likely to flow into the clearance groove 23 along the opposed surface 8b. Further, the clearance groove 23 is positioned on the radially outer side of the main body portion 7a. Therefore, the lubricating oil having passed through a gap between the damper portion 7g and the bearing hole 2b is likely to flow into the clearance groove 23.

Further, the outer diameter of the large-diameter portion 8a is larger than the outer diameter of the main body portion 7a. Therefore, the lubricating oil having flowed in the axial direction from the damper portion 7g along the outer circumferential surface of the main body portion 7a is changed in flow direction to the radial direction by the large-diameter portion 8a and is likely to flow into the clearance groove 23.

The clearance groove 23 penetrates through a partition wall which partitions the bearing hole 2b and the passage Sb of the bearing housing 2 in the radial direction of the shaft 8. The communication opening portion 24 is an opening formed in the partition wall and allows the clearance groove 23 (bearing hole 2b) and the passage Sb to communicate with each other.

Thus, part of the lubricating oil is directly ejected from the bearing hole 2b to the passage Sb without passing through the space Sa. As a result, the amount of the lubricating oil flowing to the turbine impeller 9 side with respect to the large-diameter portion 8a is suppressed. Then, the leakage of the lubricating oil from the seal ring 22 to the turbine impeller 9 side is suppressed.

Further, an inclined portion 23a is formed on an inner wall surface of the clearance groove 23 on the turbine impeller 9 side, which is positioned above the shaft 8. The inclined portion 23a is inclined in a direction of separating from the turbine impeller 9 on the radially outer side of the shaft 8. That is, the inclined portion 23a has an inclination of separating from the space Sa as separating from the shaft 8.

Further, the inclined portion 23a is opposed to the bearing surface 7e in the radial direction. The inclined portion 23a extends in the rotation direction of the shaft 8 to the lower side with respect to the shaft 8. The inclined portion 23a annularly surrounds the radially outer side of the bearing surface 7e.

When the lubricating oil rotated together with the rotation of the large-diameter portion 8a is diffused by the centrifugal force, the lubricating oil flows into the clearance groove 23. The lubricating oil having flowed into the clearance groove 23 is introduced in a direction of separating from the turbine impeller 9 along the inclined portion 23a on the inner wall surface of the clearance groove 23. Therefore, the amount of lubricating oil flowing to the turbine impeller 9 side with respect to the large-diameter portion 8a is suppressed. Thus, leakage of the lubricating oil through the seal ring 22 to the turbine impeller 9 side is suppressed.

Further, the lubricating oil having been diffused to the lower side with respect to the shaft 8 in the clearance groove 23 flows into the passage Sb through the communication opening portion 24. The lubricating oil having been diffused to the upper side with respect to the shaft 8 in the clearance groove 23 is guided by the inclined portion 23a, and is introduced to a pocket portion 25. The pocket portion 25 is a space formed in the bearing housing 2. The pocket portion 25 continues from the clearance groove 23 in the direction of separating from the turbine impeller 9 (right direction in FIG. 2).

Figure 3A:
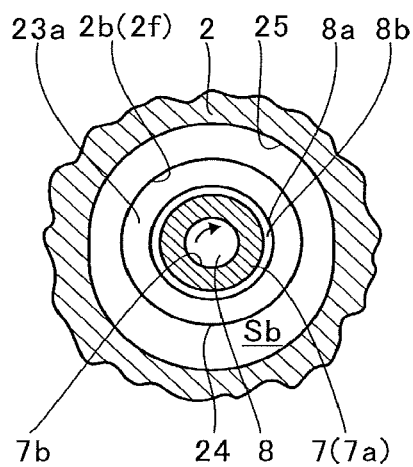
FIG. 3A is a sectional view taken along the line IIIA-IIIA of FIG. 2.
Figure 3B:
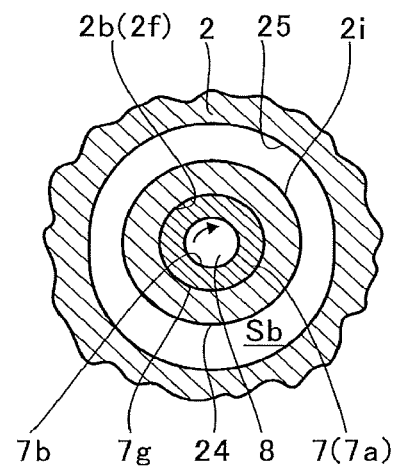
FIG. 3B is a sectional view taken along the line IIIB-IIIB of FIG. 2.

FIG. 3A is a sectional view taken along the line IIIA-IIIA of FIG. 2. FIG. 3B is a sectional view taken along the line IIIB-IIIB of FIG. 2. In FIG. 3A and FIG. 3B, for easy understanding, the bearing housing 2 is partially omitted by illustration with a break line.

As illustrated in FIG. 3B, the pocket portion 25 extends in the rotation direction of the shaft 8 on the radially outer side of the shaft 8 with a partition wall 2i being placed between the pocket portion 25 and the bearing hole 2b. The pocket portion 25 communicates with the passage Sb.

As illustrated in FIG. 2, FIG. 3A, and FIG. 3B, the lubricating oil flows into the clearance groove 23, and is introduced in the direction of separating from the turbine impeller 9 along the inclined portion 23a. Then, the lubricating oil flows into the pocket portion 25 on the upper side with respect to the shaft 8. The lubricating oil having flowed into the pocket portion 25 is introduced to the passage Sb through the pocket portion 25.

Therefore, the lubricating oil can be discharged from the clearance groove 23 to the pocket portion 25 having a large volume. Thus, the lubricating oil can efficiently be introduced to the passage Sb. At this time, the inclined portion 23a is inclined in a direction of approaching the pocket portion 25 on the radially outer side of the shaft 8. Therefore, the lubricating oil having been diffused by the centrifugal force is efficiently introduced to the pocket portion 25 and flows out to the passage Sb.

Further, as illustrated in FIG. 2, the pocket portion 25 extends to the upper side with respect to the space Sa in FIG. 2. In other words, on the upper side with respect to the shaft 8 in FIG. 2, the pocket portion 25 extends to the radially outer side of the shaft 8 with respect to the space Sa. The pocket portion 25 includes a region above the shaft 8, and extends to the radially outer side of the shaft 8 with respect to the space Sa. The pocket portion 25 includes a region positioned on a side opposite to the communication opening portion 24 over the shaft 8.

In the clearance groove 23 and the pocket portion 25, with regard to the flow of the lubricating oil, a velocity component in the radial direction is larger than a velocity component in the axial direction. In the space Sa, a velocity component of the flow of the lubricating oil in the radial direction is smaller than in the clearance groove 23. In the clearance groove 23 and the pocket portion 25 in which the velocity component of the flow in the radial direction is larger, a space extending in the radial direction is set larger than the space Sa. In such a manner, the lubricating oil is discharged from the bearing hole 2b through efficient use of the flow of the lubricating oil in the radial direction. Then, the lubricating oil is introduced to the passage Sb.

The cross section illustrated in FIG. 2 is a cross section taken along a plane including the axis of the shaft 8. In this cross section, on the upper side with respect to the shaft 8 in FIG. 2, an area occupied by both the clearance groove 23 and the pocket portion 25 is larger than an area occupied by the space Sa. Therefore, a large amount of lubricating oil can be introduced to the clearance groove 23 and the pocket portion 25. As a result, the outflow of the lubricating oil to the space Sa side is suppressed. In such a manner, the leakage of the lubricating oil from the seal ring 22 to the turbine impeller 9 side is suppressed.

As described above, the space Sa is formed on the one end 2g side of the bearing hole 2b. Meanwhile, a space Sc is also formed at another end 2j on the compressor impeller 10 side of the bearing hole 2b. The space Sc is formed between the compressor impeller 10 and the bearing hole 2b in the bearing housing 2.

Similarly to the above-mentioned space Sa, the space Sc continues to the bearing hole 2b in the axial direction of the shaft 8. On the vertically lower side with respect to the shaft 8, the space Sc extends to the radially outer side with respect to the bearing hole 2b. Further, the space Sc continues in the direction of approaching the compressor impeller 10 on the radially outer side (right direction in FIG. 2). The opposed surface 21a side of the oil thrower member 21 is inserted to the bearing hole 2b. The oil thrower member 21 partially protrudes from the bearing hole 2b. In the oil thrower member 21, an annular groove 21b is formed at a portion opposed to the another end 2j of the bearing hole 2b in the radial direction.

The lubricating oil having flowed out from the bearing hole 2b to the compressor impeller 10 side is introduced to the annular groove 21b of the oil thrower member 21. In the annular groove 21b, the lubricating oil is diffused to the radially outer side by the centrifugal force caused by rotation with the oil thrower member 21. The space Sc continues to the passage Sb on the vertically lower side of the bearing hole 2b. Therefore, the lubricating oil is introduced from the space Sc to the oil discharge port 2h through the passage Sb.

Two seal rings 26 are arranged between the space Sc and the compressor impeller 10. The seal rings 26 are positioned in gaps between the oil thrower member 21 and the bearing housing 2 in the radial direction. The seal rings 26 suppress leakage of the lubricating oil from the space Sc side to the compressor impeller 10 side.

In the bearing hole 2b, similarly to the clearance groove 23 on the turbine impeller 9 side, a clearance groove 27 is formed on the compressor impeller 10 side. The clearance groove 27 is formed in the inner circumferential surface 2f of the bearing hole 2b. The clearance groove 27 is separated from the space Sc in the axial direction of the shaft 8, that is, to the center side of the bearing hole 2b. The space Sc is positioned between the compressor impeller 10 and the clearance groove 27.

The opposed surface 21a of the oil thrower member 21 is positioned on the radially inner side of the clearance groove 27. Therefore, the lubricating oil having lubricated the bearing surfaces 7c and 7f is likely to flow into the clearance groove 27 along the opposed surface 21a. Further, an outer periphery of each of the bearing surfaces 7e and 7f is chamfered and formed into a taper shape. An outer diameter of the chamfered bearing surface 7f is smaller than an outer diameter of the opposed surface 21a of the oil thrower member 21. Therefore, the lubricating oil is diffused by the centrifugal force and easily flows into the clearance groove 27. Further, the clearance groove 27 is positioned on the radially outer side of the main body portion 7a. Therefore, the lubricating oil having passed through the gap between the damper portion 7h and the bearing hole 2b is likely to flow into the clearance groove 27.

Similarly to the above-mentioned communication opening portion 24, a communication opening portion 28 is an opening formed in the partition wall partitioning the bearing hole 2b and the passage Sb in the radial direction of the shaft 8 and allows the clearance groove 27 (bearing hole 2b) and the passage Sb to communicate with each other.

A pocket portion 29 continues from the clearance groove 27 in a direction of approaching the compressor impeller 10 (right direction in FIG. 2). The lubricating oil having been diffused to the upper side with respect to the shaft 8 in the clearance groove 27 is introduced to the pocket portion 29. In FIG. 2, a boundary between the clearance groove 27 and the pocket portion 29 is indicated by a boundary line B. Similarly to the pocket portion 25, the pocket portion 29 extends in the rotation direction of the shaft 8 on the radially outer side of the shaft 8 with a partition wall 2k being placed between the pocket portion 29 and the bearing hole 2b. The pocket portion 29 communicates with the space Sc and the passage Sb.

Further, in the clearance groove 27, an inclined portion 27a is formed on an inner wall surface which is opposed to the semi-floating bearing 7 and the oil thrower member 21 in the radial direction. The inclined portion 27a is inclined in a direction of approaching the pocket portion 29 on the radially outer side of the shaft 8. Further, the inclined portion 27a is opposed to the bearing surface 7f in the radial direction.

The lubricating oil having rotated together with the rotation of the oil thrower member 21 is diffused by the centrifugal force and flows into the clearance groove 27. The diffused lubricating oil is introduced to the pocket portion 29 along the inclined portion 27a on the inner wall surface of the clearance groove 27. Therefore, the lubricating oil is efficiently introduced to the passage Sb and the space Sc through the pocket portion 29. As a result, the leakage of the lubricating oil through the seal rings 26 to the compressor impeller 10 side is suppressed.

Further, the pocket portion 29 extends to the upper side with respect to the space Sc in FIG. 2. In other words, on the upper side with respect to the shaft 8 in FIG. 2, the pocket portion 29 extends to the radially outer side of the shaft 8 with respect to the space Sc. The pocket portion 29 includes a region above the shaft 8. The pocket portion 29 extends to the radially outer side of the shaft 8 with respect to the space Sc. The pocket portion 29 includes a region positioned on a side opposite to the communication opening portion 28 over the shaft 8.

Similarly to the clearance grooves 23 and the pocket portion 25 described above, in the clearance groove 27 and the pocket portion 29 in which the velocity component of the flow in the radial direction is larger, a space extending in the radial direction is set large. In such a manner, the lubricating oil can be discharged from the bearing hole 2b through efficient use of the flow of the lubricating oil in the radial direction.

In the above-mentioned embodiment, description is made of the case in which the clearance grooves 23 and 27 and the inclined portions 23a and 27a are provided to both of the turbine impeller 9 side and the compressor impeller 10 side. However, the clearance grooves 23 and 27 and the inclined portions 23a and 27a may be provided to only one of the turbine impeller 9 side or the compressor 10 side.

Further, in the above-mentioned embodiment, description is made of the case in which the inclined portion 27a is inclined in the direction of approaching the pocket portion 29 (compressor impeller 10) on the radially outer side of the shaft 8. However, similarly to the inclined portion 23a, the inclined portion 27a may be inclined in a direction of separating from the compressor impeller 10 on the radially outer side of the shaft 8. Further, the pocket portion 29 may be formed so as to continue from the clearance groove 27 in the direction of separating from the compressor impeller 10. Also in those cases, similarly to the clearance groove 23 and the pocket portion 25 on the turbine impeller 9 side described above, the leakage of the lubricating oil through the sealing rings 26 to the compressor impeller 10 side is further suppressed.

Further, in the above-mentioned embodiment, description is made of the case in which the pocket portions 25 and 29 are provided. However, the pocket portions 25 and 29 are not indispensable configurations.

Further, in the above-mentioned embodiment, description is made of the case in which the pocket portion 25 includes a region which is positioned on the side opposite to the communication opening portion 24 over the shaft 8 with respect to the space Sa and extends to the radially outer side of the shaft 8. However, the pocket portion 25 may extend only to the radially inner side of the shaft 8 on the side opposite to the communication opening portion 24 over the shaft 8 with respect to the space Sa.

Similarly, in the above-mentioned embodiment, description is made of the case in which the pocket portion 29 extends to the radially outer side of the shaft 8 on the side opposite to the communication opening portion 28 over the shaft 8 with respect to the space Sc. However, the pocket portion 29 may extend only to the radially inner side of the shaft 8 on the side opposite to the communication opening portion 28 over the shaft 8 with respect to the space Sc.

Further, in the above-mentioned embodiment, description is made of the case in which the semi-floating bearing 7 has the bearing surfaces 7e and 7f configured to receive the load acting in the axial direction from the large-diameter portion 8a and the oil thrower member 21. Moreover, description is made of the case in which the inclined portions 23a and 27a are opposed to the bearing surfaces 7e and 7f in the radial direction. However, the semi-floating bearing 7 does not need to have the bearing surfaces 7e and 7f. Further, the inclined portions 23a and 27a do not need to be opposed to the bearing surfaces 7e and 7f in the radial direction. However, when the semi-floating bearing 7 has the bearing surfaces 7e and 7f, and the inclined portions 23a and 27a are opposed to the bearing surfaces 7e and 7f in the radial direction, the following effect can be achieved. That is, the lubricating oil ejected in the radial direction through the gap between the bearing surfaces 7e and 7f and the large-diameter portion 8a or the oil thrower member 21 is efficiently discharged. Therefore, the oil discharge performance can further be improved.

Further, in the above-mentioned embodiment, description is made of the case in which the inclined portion 23*a* extends in the rotation direction of the shaft 8 to the communication opening portion 24 side. However, the inclined portion 23*a* does not need to extend in the rotation direction of the shaft 8 to the communication opening portion 24 side. However, when the inclined portion 23*a* extends in the rotation direction of the shaft 8 to the communication opening portion 24, the following effect can be achieved. That is, the lubricating oil diffused from the large-diameter portion 8*a* of the shaft 8 can be introduced in the direction of separating from the turbine impeller 9 over the entire periphery.

The embodiment of the present disclosure has been described above with reference to the attached drawings, but, needless to say, the present disclosure is not limited to the embodiment. It is apparent that those skilled in the art may arrive at various alternations and modifications within the scope of claims, and those examples are construed as naturally falling within the technical scope of the present disclosure.

INDUSTRIAL APPLICABILITY

The present disclosure is applicable to a bearing structure which is configured to axially support a shaft, and to a turbocharger.

What is claimed is:

1. A bearing structure, comprising:
    a housing;
    a bearing hole, which is formed in the housing, and receives a bearing configured to axially support a shaft having one end provided with an impeller, the bearing including a thrust bearing surface which is opposed to a collar portion formed on the shaft in an axial direction of the shaft;
    a clearance groove, which is formed in an inner circumferential surface of the bearing hole, and communicates with a passage formed on a vertically lower side with respect to the shaft;
    a space, which is formed in the housing, being positioned between the impeller provided at the one end of the shaft and the clearance groove, and communicating with the passage; and
    an inclined portion formed on an inner wall surface of the clearance groove, wherein both the inclined portion and the clearance groove are positioned at least above the shaft, the inclined portion being inclined in a direction of separating from the impeller on a radially outer side of the shaft,
    wherein the inclined portion is opposed to the thrust bearing surface in a radial direction, and
    wherein the collar portion formed on the shaft is positioned between the space and the clearance groove.

2. The bearing structure according to claim 1, wherein the inclined portion extends in a rotation direction of the shaft to the vertically lower side with respect to the shaft.

3. A turbocharger, comprising the bearing structure of claim 1.

4. The bearing structure according to claim 1, further comprising a pocket portion which extends, on the radially outer side of the shaft with respect to the clearance groove, in a rotation direction of the shaft with a partition wall being placed between the pocket portion and the bearing hole.

5. The bearing structure according to claim 4, wherein the inclined portion is inclined in a direction of approaching the pocket portion on the radially outer side of the shaft.

6. The bearing structure according to claim 4, wherein the pocket portion continues from the clearance groove in the direction of separating from the impeller.

7. The bearing structure according to claim 4, wherein the pocket portion continues from the clearance groove in a direction of approaching the impeller.

8. The bearing structure according to claim 1, wherein the thrust bearing surface is positioned radially inward of the clearance groove.

\* \* \* \* \*